A. ADAMS.

LATCH.

No. 11,609. Reissued June 15, 1897.

Witnesses:

E. B. Bolton

H. N. Jenkins

Inventor:

Austin Adams

By J. O. Fowler Jr.

his Attorney.

THE NORRIS PETERS CO., PHOTO-LITHO., WASHINGTON, D. C.

UNITED STATES PATENT OFFICE.

AUSTIN ADAMS, OF NEW YORK, N. Y.

LATCH.

SPECIFICATION forming part of Reissued Letters Patent No. 11,609, dated June 15, 1897.

Original No. 504,263, dated August 29, 1893. Application for reissue filed June 12, 1896. Serial No. 595,369.

*To all whom it may concern:*

Be it known that I, AUSTIN ADAMS, a citizen of the United States, and a resident of New York, in the county and State of New York, have invented a certain new and useful Latch, of which the following is a specification.

My invention relates to appliances designed for purposes of fastening movable articles—as, for example, doors, covers, &c.—and of automatically locking the same, and also to means whereby the same movable articles may be wedged or drawn tight to their seat or closed position; and it has for its object the provision of a device simple in construction, inexpensive, and readily applied and operated, and also efficient in practical use.

To attain the desired end, my invention consists in the construction and arrangement of parts first described, and then pointed out in the claims.

Figure 1:
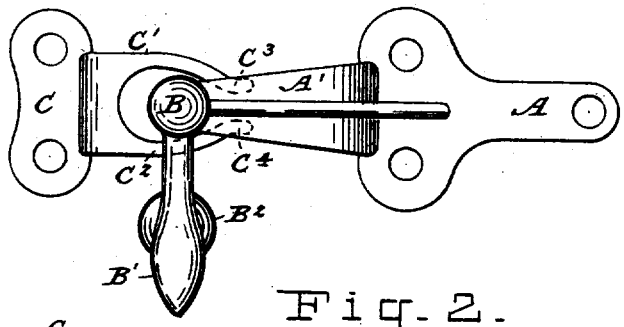
Figure 2:
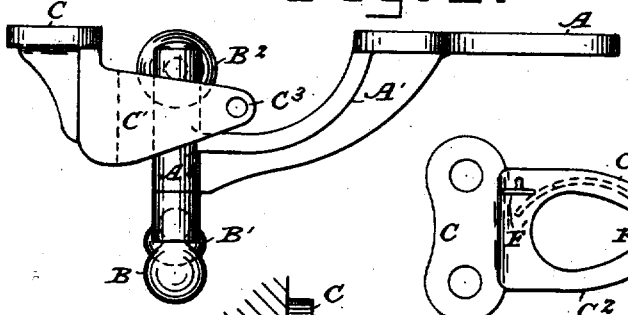
Figure 4:
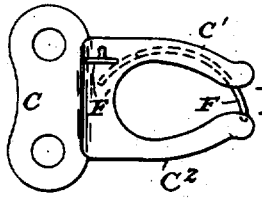
Figure 3:
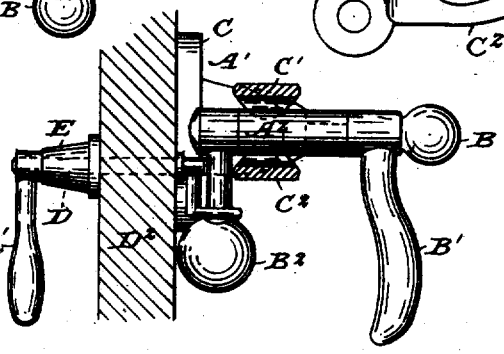

In the drawings which form a part of this specification, Figure 1 represents a front elevation of a fastener constructed according to my invention. Fig. 2 is a top plan view of the same. Fig. 3 is a side elevation, partly in section, of my fastener, also showing my manual unlocking device; and Fig. 4 is a detail of my retaining means provided with an independent lock.

Like letters of reference indicate like parts in all the views.

A represents a plate constructed and arranged to be bolted or otherwise secured to the movable article to be fastened, as a door, and provided with a forwardly-projecting arm A′, carrying at approximately a right angle to the same a horizontal tubular bearing $A^2$, through which passes the shaft B, which is enlarged on opposite sides of the same in order to abut against the said bearing. The shaft B carries at its opposite extremities an outer operating-handle B′ and an inner weighted lever $B^2$ and is constructed and arranged to turn freely in the tubular bearing $A^2$. The said arm A′ projects a distance beyond the edge of the door, &c., in order that when the same is closed the preferably weighted lever $B^2$ will engage a retaining device consisting of a base-plate C, constructed and arranged to be bolted or otherwise secured to the stationary part, as a door-casing, adjacent to the said movable article. This plate C is provided with two forwardly-projecting jaws C′ $C^2$, facing the projecting arm A′, the two jaws C′ $C^2$ becoming narrower toward their extremities, which approach each other. As the door is closed the weighted lever $B^2$ will engage the lever-jaw $C^2$ and will ride upon the inclined edge of the same, thus gradually turning the shaft B until the lever $B^2$ assumes a horizontal position, whereupon the said weighted lever will pass between the jaws C′ $C^2$ and then fall by gravity behind the jaw $C^2$. The door, &c., is now locked by reason of the jaw $C^2$ being located between the handle B′ and the weighted lever $B^2$, and it will be noted that the locking of the same has been accomplished entirely automatically solely by pushing the door, &c., to a closed position. In order to wedge or effect an air-tight fastening, I now press the depending handle B′ to the left, whereupon the weighted lever $B^2$ will be moved still farther along the inclined inner edge of the lower jaw $C^2$, whereupon the door, &c., will be drawn with great force toward and rigidly held very tightly to the casing, &c.

In cases where my fastening device is used on a door of a compartment, &c., I provide means for opening or unlocking the same from the inside, as follows: A shaft D, supported by a bearing E, secured to the inner face of the door-casing, carries at its extremities a handle D′ and a crank $D^2$, both rigidly secured to the said shaft D. The crank $D^2$ is constructed and arranged to engage with the weighted lever $B^2$, and by turning the handle D′ the weighted lever may be caused to assume a horizontal position, whereupon the same may be pushed between the jaws C′ $C^2$ again and the door thereby opened. I also use an independent lock in connection with my self-locking fastener, by means of which the same may be further secured—as, for example, by attaching a padlock (not shown) to the jaws C′ $C^2$, containing the shaft B, by means of the orifices $C^3$ $C^4$, located at the inward extremities of said jaws, or, as shown in Fig. 4, I close the said jaws by means of a lock-bolt F, controlled and operated by means of a key F′.

In case of any sagging or shrinking or looseness of the door, &c., occasioned by long use my wedge fastener will draw the parts closely and hold the same rigidly together, and the simplicity of my fastener, the readiness with which it may be applied, together with the efficiency of the same in practical operation, render it applicable to a great variety of articles. It will be noted that the jaws C′ $C^2$ of my retaining means are of a similar construction, the appliance thus being interchangeable, so as to be used with either a right or left hand door. In use with a left-hand door the handle B′ will be turned to the right in order to wedge the same and the weighted lever $B^2$ will ride upon the jaw C′, which will in this case be the lower jaw, as the jaws C′ $C^2$ will be turned around so as to face the left.

As it is evident that many slight changes in the construction and relative arrangement of parts might be resorted to without departing from the spirit and scope of my invention, I would have it understood that I do not restrict myself to the particular construction and arrangement of parts shown and described, but that I reserve the right to make such changes, and that

What I claim as new, and desire to secure by Letters Patent, is—

1. The combination, in a fastening device, with an arched laterally-projecting bracket attached to a door and supporting a weight and handle, of a keeper secured to the jamb and provided with a jaw narrowed toward its extremity, whereby the fastening device may be released and the door opened with one hand.

2. The combination, in a fastening device, with a laterally-projecting bracket attached to a door and supporting a weight and handle, of a keeper being provided with a double incline whereby the door may be opened and also closed and wedged tight with one hand.

3. The combination, in a fastening device, with a bracket attached to a door and supporting a weight and handle of a keeper secured to the jamb and independent means within the closed chamber for releasing the weighted arm from the keeper.

4. The combination, in a fastening device, with one member consisting of a forwardly and laterally projecting bracket supporting a pivoted or swinging latch, of another member consisting of a keeper provided with an inclined edge or way.

5. The combination, in a fastening device, with one member consisting of a pivoted or swinging latch of another member consisting of a keeper provided with an inclined edge or way, and of independent means within the closed chamber for releasing the latch from the keeper.

6. The combination, in a fastening device, with a laterally-projecting bracket attached to a door and supporting a swinging or pivoted latch, of a keeper secured to the jamb and provided with a jaw narrowed toward its extremity whereby the fastening device may be released and the door opened with one hand.

In testimony of the foregoing specification I do hereby sign the same, in the city of New York, county and State of New York, this 19th day of May, A. D. 1896.

AUSTIN ADAMS.

Witnesses:
H. N. JENKINS,
G. DITTMAR.